Patented Apr. 5, 1932

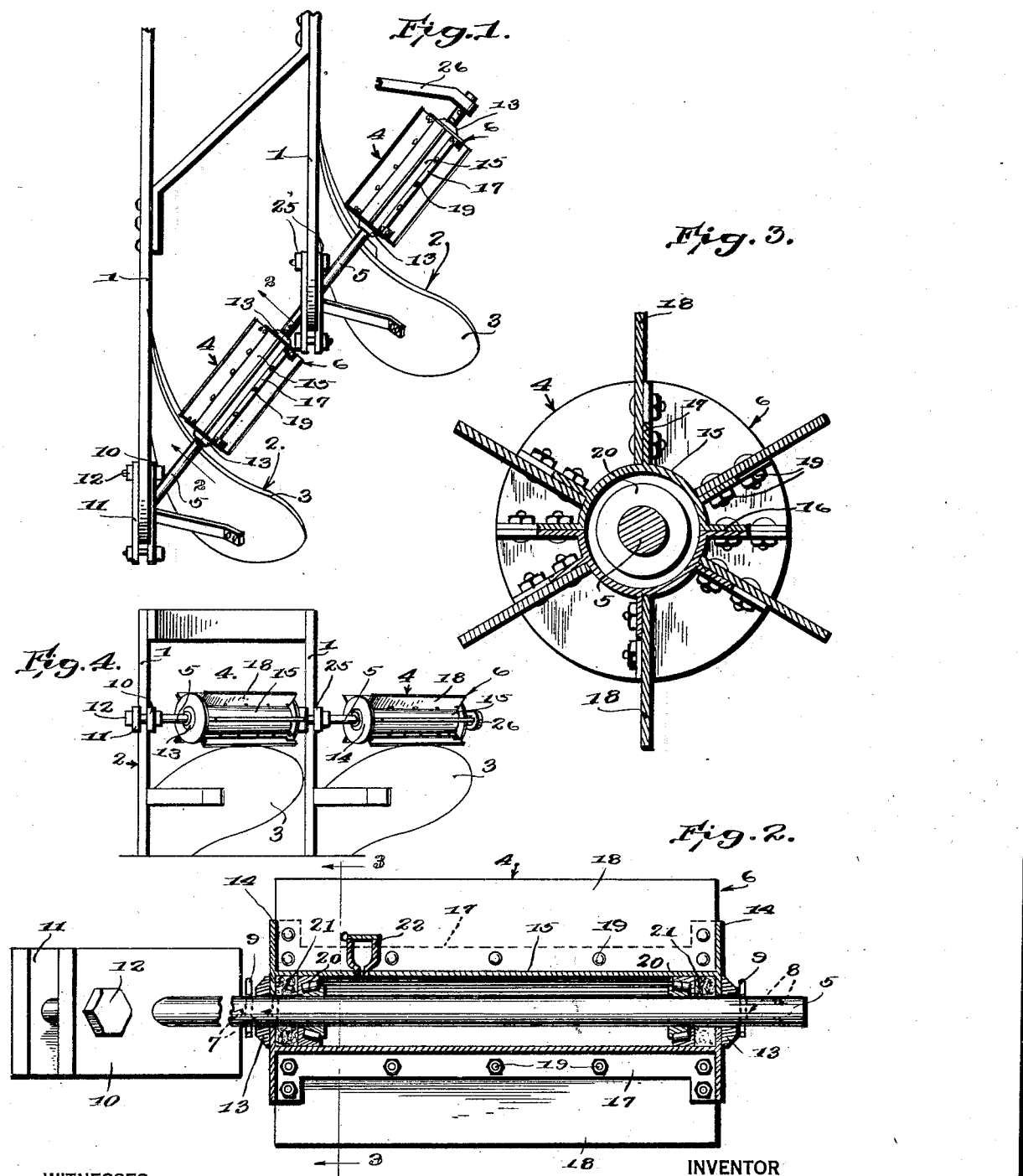

1,852,908

UNITED STATES PATENT OFFICE

ELMER L. VISE, OF INDIANAPOLIS, INDIANA

FARM PLOW APPLIANCE

Application filed July 1, 1929. Serial No. 375,229.

This invention relates to improvements in farm plows, and it consists of the constructions, combinations and arrangements herein described and claimed.

An object of the invention is to provide an appliance to be attached to the beams of a plow for the purpose of pressing or holding down loose surface substances such as mulch, weeds, heavy coats of farm manure, remaining elements of former crops and other litter as the soil is being turned, thus preventing such substances from sliding sideways out of reach of the inverted earth and insuring that the latter will thoroughly cover said substances.

A further object of the invention is to provide an appliance which in addition to the foregoing purposes will prevent the accumulation of surface substances in front of the plow and the hanging thereof upon the plow beam.

Other objects and advantages will appear in the following specification, reference being had to the accompanying drawings, in which:—

Figure 1 is a plan view of a pair of plows illustrating the connection of an improved appliance to each;

Figure 2 is a longitudinal section taken substantially on the line 2—2 of Figure 1;

Figure 3 is a cross-section taken on the line 3—3 of Figure 2; and

Figure 4 is a rear elevation of the appliance.

As already indicated in a general way, this invention has to do with the cultivation of soil, to which end it makes a contribution toward putting the soil in as favorable a condition as possible for the crop. It is, of course, a matter of common knowledge that plowing is the basic operation in soil cultivation.

The function of the plow is to invert the soil, thus burying and assisting the decay of vegetable and organic matter. The litter accumulates on the surface either naturally, as in the instance of weeds, remaining elements of former crops and other soil surface litter or artificially as in the instance of mulch or manure. It is a function of the plow to turn these substances under and bring to the surface a layer of soil from below to be weathered and sweetened for the use of a succeeding crop.

However, the act of plowing does not of itself bring about a most desirable state as regards the disposal of loose surface substances. As the earth is raised, it naturally assumes an inclination which is increased as the plow progresses and as the earth turns over. The loose material thus has an ample opportunity to either slide sidewise or get in the way of the plow so that the latter becomes encumbered and accumulations of the loose material hang upon the plow beam. It is the purpose of the invention to hold all loose material down to the surface of the soil so that when the plow comes along it will slice up the soil and lay it directly over the loose material, burying the litter and establishing a most desirable condition.

Reference is made to the drawings. Figure 1 illustrates a pair of plow beams 1 each of which carries a plow generally indicated 2, particular reference being made to the mold board 3 in front of each of which one of the appliances 4 is situated. It may be stated here that the appliance requires no particular type or form of plow for its application. For example, Figure 1 illustrates the application of the device to a gang plow. In such instances, the appliances 4 are carried by retainer or bearing shafts 5, the adjoining ends of which have matching coupling plates 25 (Figure 1) with which bolts and nuts are used to clamp such ends to the nearest plow beam. The free and otherwise unsupported end of the innermost shaft 5 may be held by a suitable bracket 26 attached to a part of the plow frame.

The following description is devoted to a single one of the appliances, and to that end a bearing shaft 5 is selected having a clamping arrangement at only one end. The bearing or retaining shaft 5, to which reference has just been made, is uniform in diameter throughout its length for the specific purpose of permitting a sliding adjustment of the rotor generally designated 6 along the shaft. In order that adjustments of the rotor as to distance from the plow beam 1 may be fixed, the shaft 5 is drilled with sets of holes 7 and 8. These sets are remote from each other being respectively adjacent to the plow beam and to the free extremity of the shaft. Cotter pins or other suitable fastening means 9 are inserted in suitable ones of the sets of holes thus holding the rotor to whatever adjustment may have been made.

A plate 10, integral with one end of the shaft 5, forms part of a clamp by which the appliance is fixedly attached to the plow beam 1. This clamp is completed by a companion plate 11 and a sufficient number of bolts and nuts 12. Washers 13 abut the cotter pins 9 and face the ends of the rotor 6 which are defined by the circular end plates 14 of a hollow hub 15 which is split, flanged and bolted together at 16 to facilitate assemblage upon the shaft 5. The sets of holes 7, 8 adjoin the ends of the hub 15.

Ribs 17 extending lengthwise of the hub 15 and in radial directions along the inner faces of the end plates 14 provide mountings for blades 18. The blades are removably secured at 19. It is to be observed that the blades 18 are rectangular. They comprise nothing more than plain, flat plates. The outer extremities of these blades have rectilinear edges which are intended to do nothing more than to press loose litter into the earth. They are not intended to exercise any cutting, scraping or agitating function. In practice, it will be a consideration to make possible the addition or subtraction of blades so that the rotor may run on a greater or lesser number of blades. The provision of six ribs 17 is not necessarily adhered to as shown in the drawings. A greater number of ribs may be provided so that a greater latitude may be accorded in the subtraction of blades.

Any suitable bearing apparatus may be employed for the rotatable mounting of the rotor upon the shaft 5, but for the purpose of illustration a pair of roller bearings 20 is shown, these being backed by a suitable packing 21 which will prevent the leakage of oil. It is the intention to fill the hub 15 with oil, for which purpose it is made hollow. The oil is introduced at a cup 22. The general aspect of the rotor 6 is that of a cylinder; that is to say, the peripheral edges of the blades 18 are parallel, as shown in Figure 2, thus giving the rotor a uniform diameter at all cross-sectional points.

The operation is readily understood. As has been indicated already, the handling of accumulations of mulch, weeds, stalks, etc., on the ground surface presents quite a problem during the plowing operation. The purpose is to plow this material under, and in order to prevent it from sliding and sloughing off to one side, as well as from gathering in front of the plow beam, it is necessary to press and hold it down.

This purpose is best accomplished by the appliance here disclosed. It is most essential that the correct position be found and adopted. It is necessary that the retainer shaft 5 shall support the rotor 6 squarely over the loosened soil as it is being turned, because the loosened soil being put in motion by the mold board of the plow becomes the propelling power which turns the rotor and so "walks" over the loose material, continually pressing and holding it down. By setting the rotor in exactly the proper position and at the proper angle, it will revolve forwardly, and it is only by this direction of rotation that the object is attained.

In instances where but a single rotor will be employed, the retainer shaft 5 will have but a single set of clamp plates at one end. But in cases where more than one rotor is employed, the adjoining ends of the succeeding shafts will be equipped with plates that will be coupled together around the nearest plow beams much on the order of the suggestion in the center of Figure 1. The succeeding rotors will thus be substantially in alinement, and will be found to possess an angular setting which is exactly right. This setting, as already indicated, is at a forward angle to the direction of motion of the plow when turning the earth.

It requires but a brief reference to Figure 2 to emphasize the adjustability of the rotor. It has been brought out that the shaft 5 is of uniform diameter so that the adjustment of the location of the rotor as to distance from the plow beam 1 may be made by merely sliding the rotor along the shaft after appropriate ones of the cotter pins 9 have been removed. The bearings 20 are assembled upon the shaft before hand, and the two-part hub is clamped around the bearings afterward.

While the construction and arrangement of the improved farm plow appliance is that of a generally preferred form, obviously modifications and changes may be made without departing from the spirit of the invention or the scope of the claims.

I claim:—

1. The combination of a plurality of plow beams and plows, a plurality of rotors which are forwardly revolved by contact with the earth as turned, shafts upon which the rotors are mounted, and means associated with the ends of the shafts for coupling them to the plow beams in substantial alinement and at a forward angle in respect to the direction of movement of the plows.

2. The combination of a plurality of plow beams and plows, a plurality of rotors which are forwardly revolved by contact with the earth as turned, each rotor including a hub and blades radiating from the hub, said blades having blunt, rectilinear edges for pressing loose litter into the earth, shafts upon which the rotors are mounted, and means associated with the ends of the shafts for coupling them to the plow beams in substantial alinement and at a forward angle in respect to the direction of movement of the plows.

3. The combination of a plurality of plow beams and plows, a plurality of rotors which are forwardly revolved by contact with the earth as turned, shafts upon which the rotors are mounted, each shaft having sets of holes remote from each other, washers to abut the ends of the rotors, cotter pins disposed outside of the washers and being insertible in certain ones of the sets of holes to fix the position of the rotors with reference to the plows, and means associated with the ends of the shafts for coupling them to the plow beams in substantial alinement and at a forward angle in respect to the direction of movement of the plows.

ELMER L. VISE.